May 5, 1959 W. A. BARKER ET AL 2,885,058
SHOE HANDLING APPARATUS
Filed May 31, 1957 9 Sheets-Sheet 8
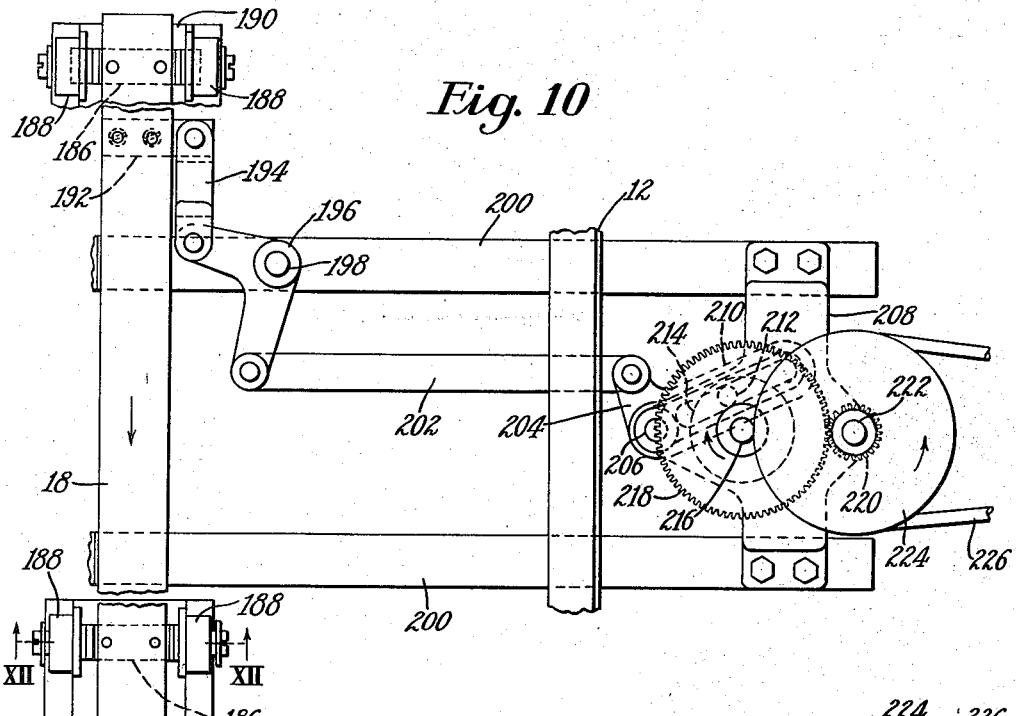
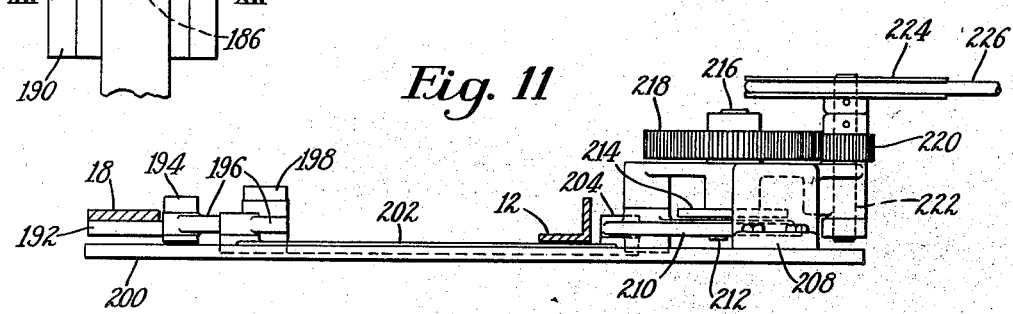
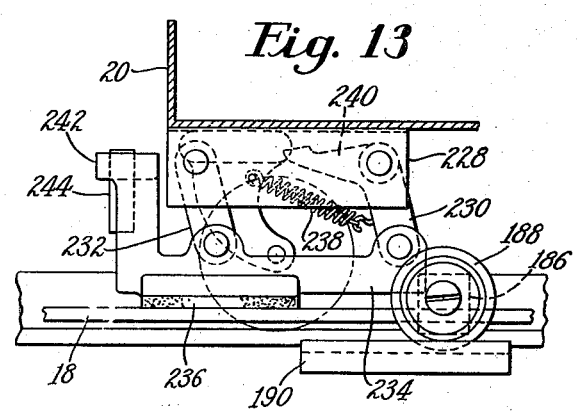
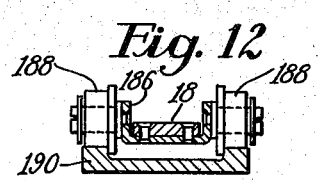
Inventors
William A. Barker
John L. Lutyens
By their Attorney

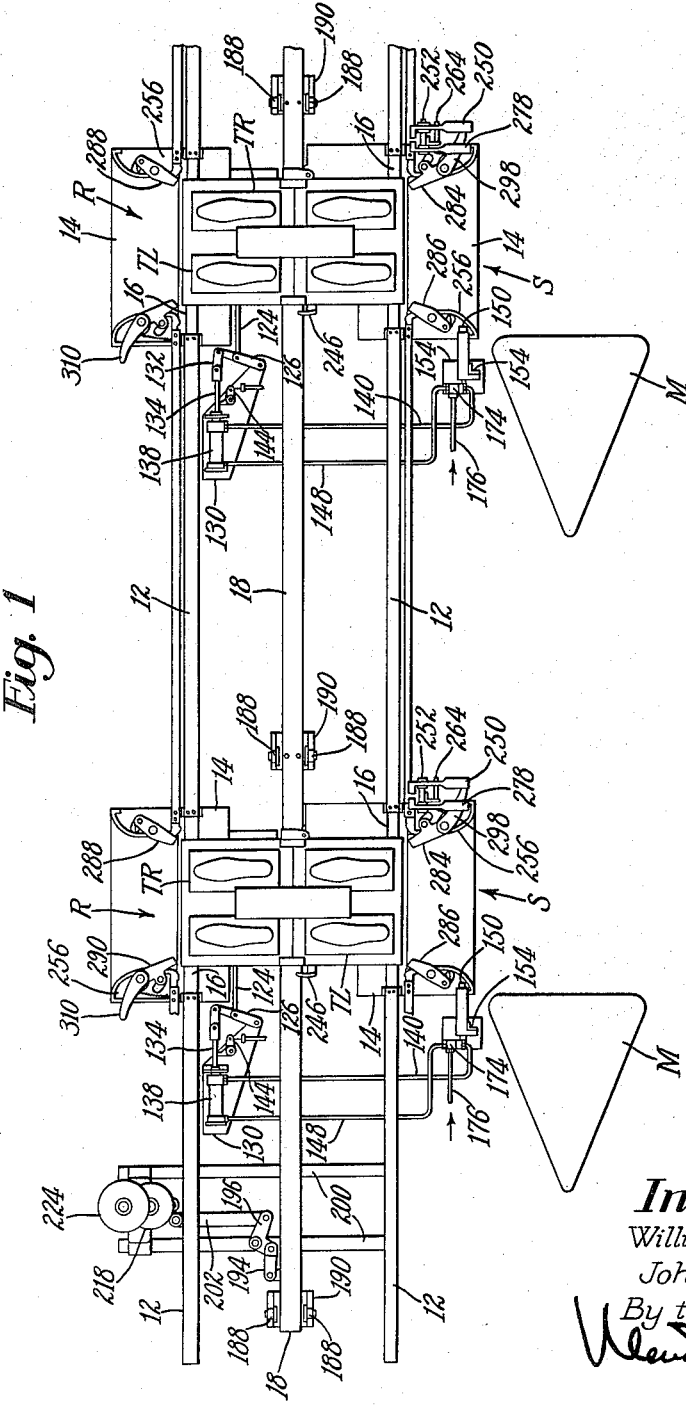

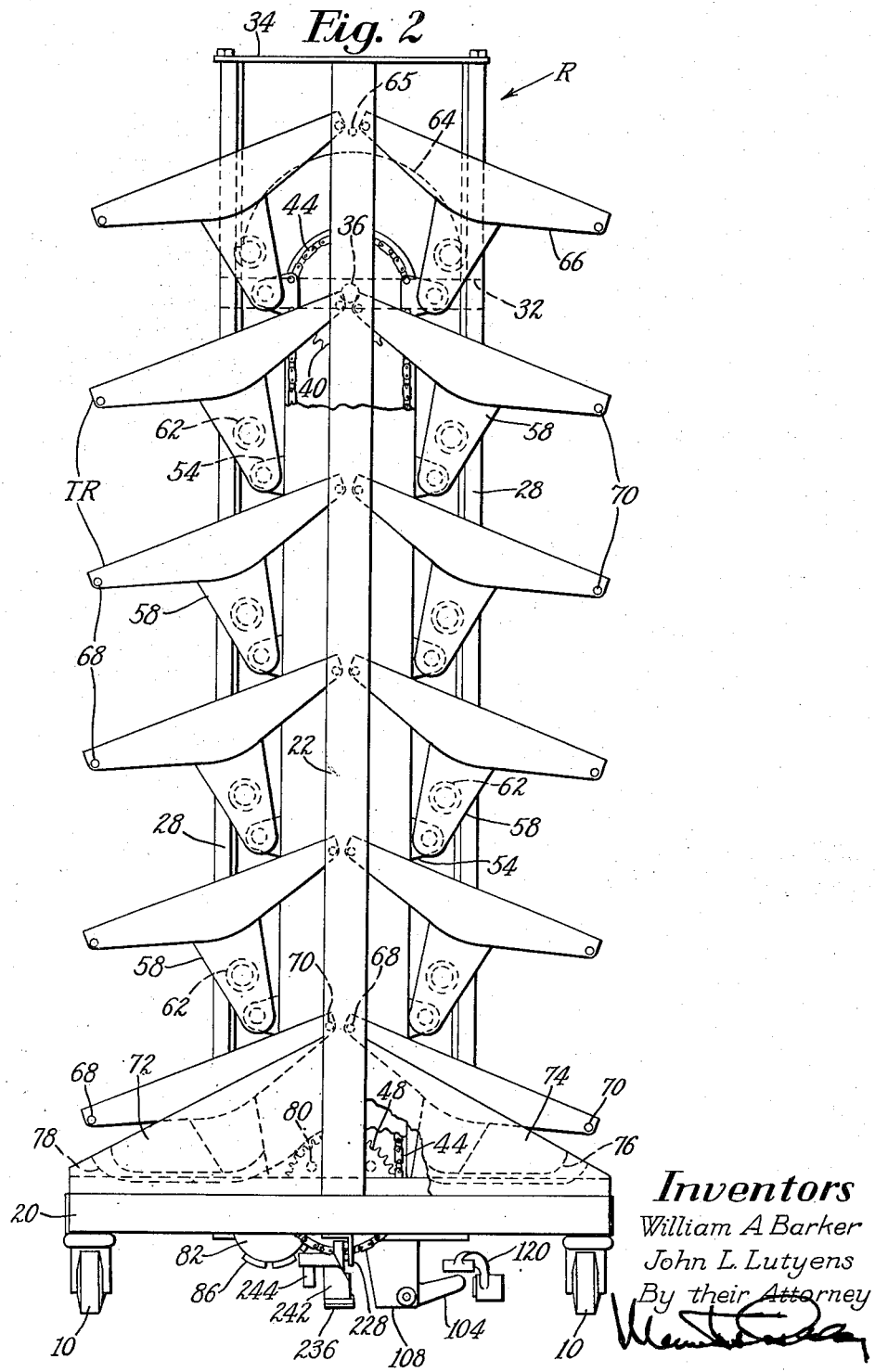

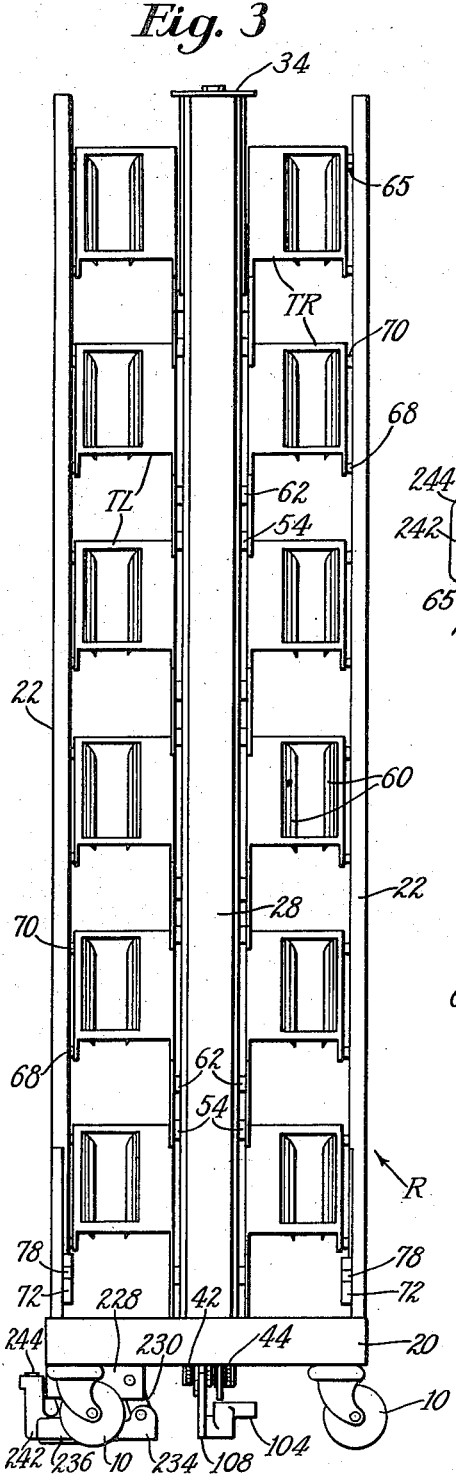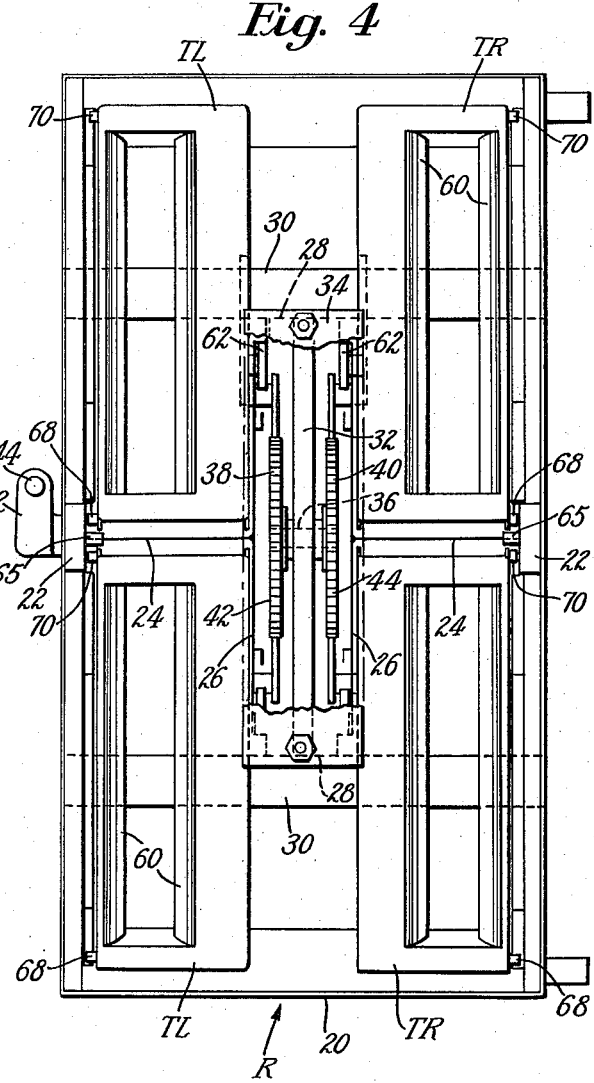
Inventors
William A. Barker
John L. Lutyens
By their Attorney Inventors
William A. Barker
John L. Lutyens
By their Attorney

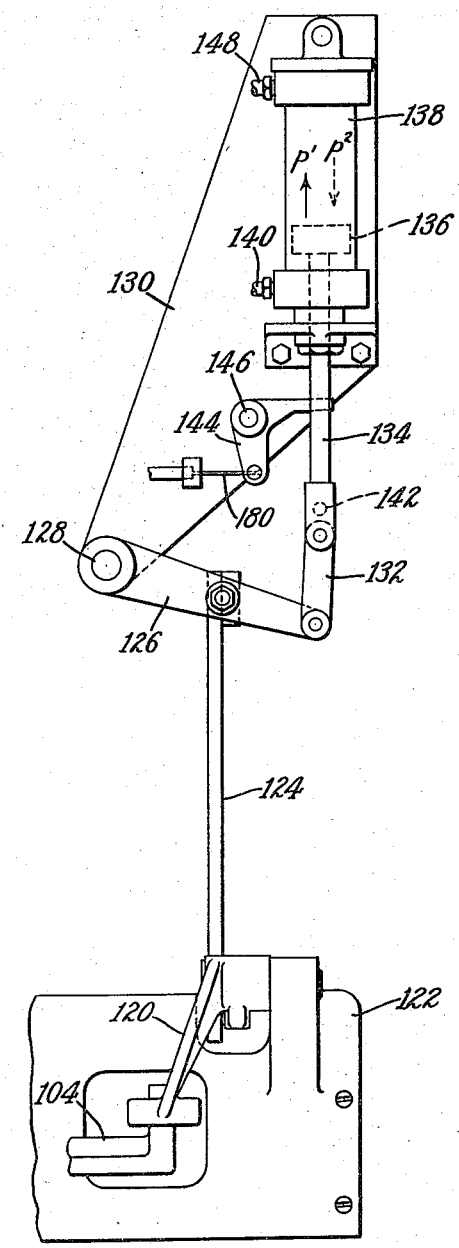

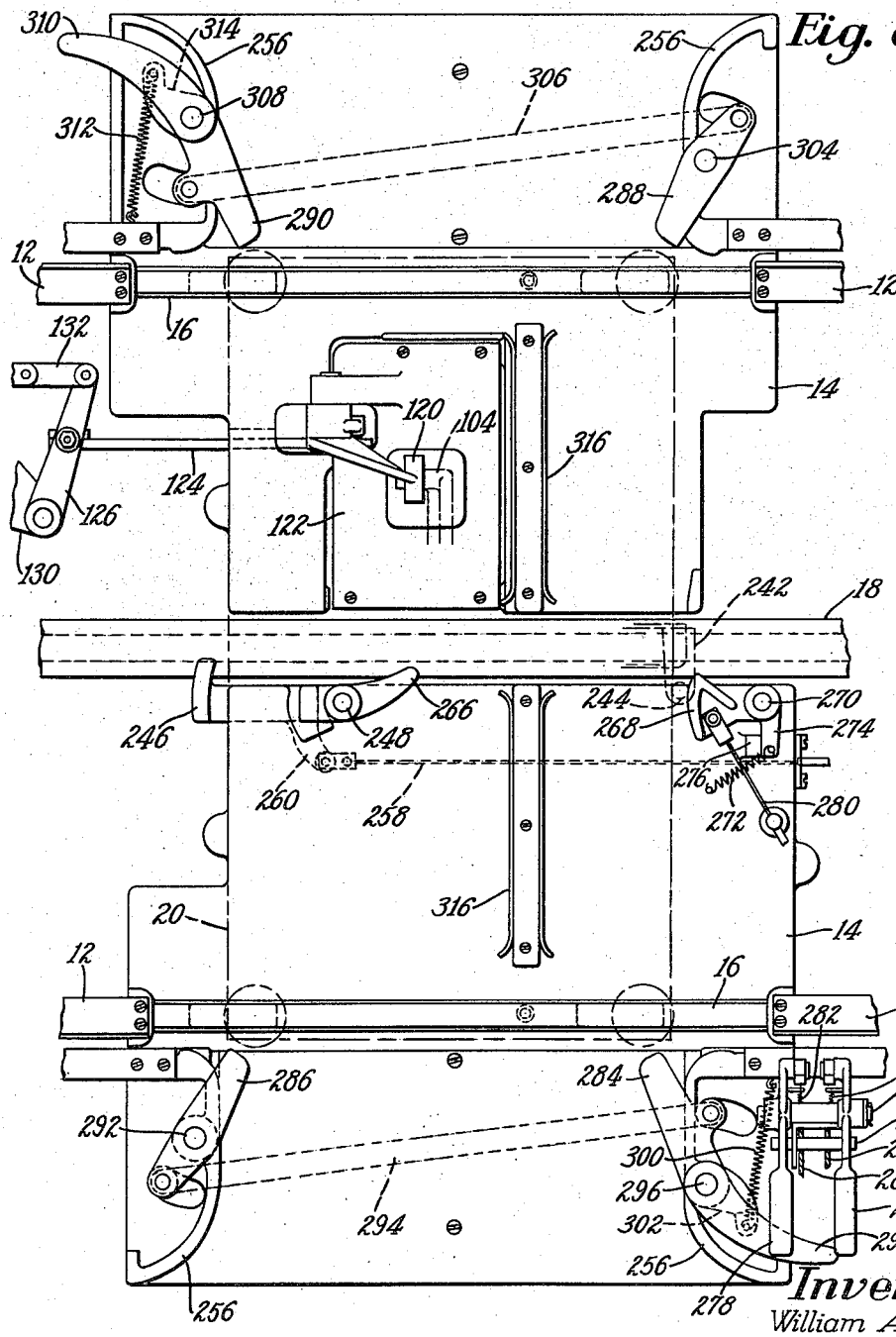

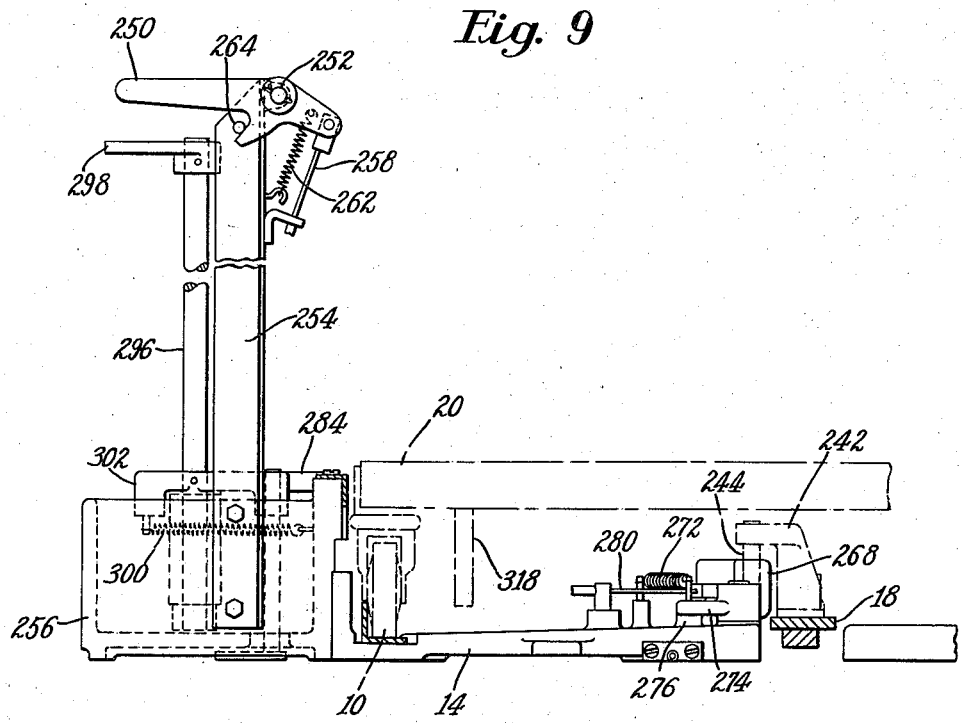

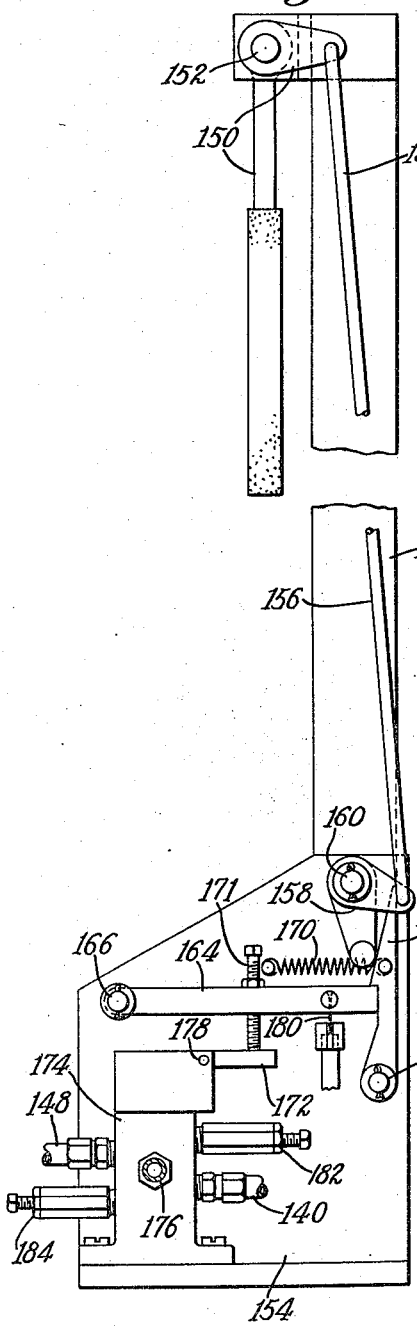
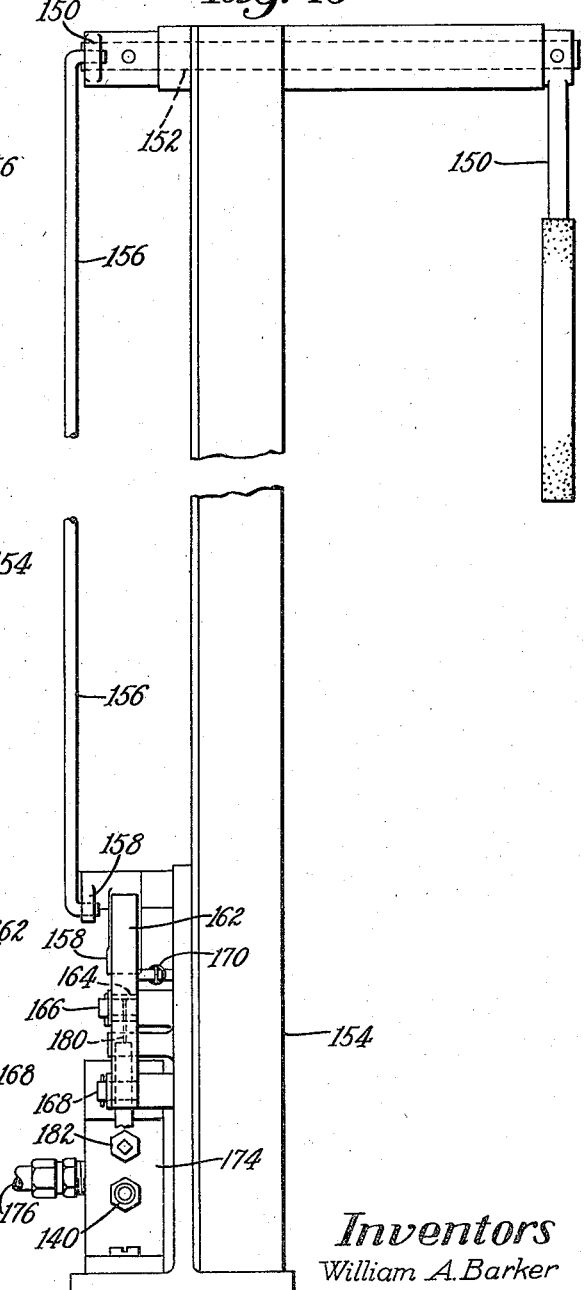

United States Patent Office 2,885,058
Patented May 5, 1959

2,885,058

SHOE HANDLING APPARATUS

William A. Barker and John L. Lutyens, Leicester, England, assignors to United Shoe Machinery Corporation, Boston, Mass., a corporation of New Jersey Application May 31, 1957, Serial No. 662,712

Claims priority, application Great Britain June 8, 1956

13 Claims. (Cl. 198—19)

This invention relates to the manufacture of shoes and is illustrated herein as embodied in improved work handling apparatus for facilitating the supply and presentation of work pieces to a machine or series of machines for operating upon the work pieces.

In the manufacture of shoes, work pieces, such as lasted shoes in an incomplete state of manufacture, are commonly stored upon racks for holding twelve pairs, the racks being rolled along the factory floor from machine to machine by the operators after the shoes or work pieces have been operated upon by each machine. The work pieces are supported on each rack at various heights between a lower level somewhat above the floor and an upper level at about the height of the operator. In presenting the work pieces to a machine, the operator is required to remove many of them from and replace them upon the rack at levels above or below the most convenient work handling level. This reaching for the work pieces, as well as the moving of the racks from machine to machine, accounts for a considerable portion of the effort expended by the operator in a day's work.

Such handling of the racks and the presentation of the work pieces to a machine from different positions on the rack not only tires the operator but also tends to upset the uniformity of the operator's action or rhythm in presenting the work pieces to the machine.

In view of the foregoing, it is a principal object of the invention to relieve operators from the burden of moving racks to or away from their machines, as well as to permit all the work pieces on each rack to be removed therefrom and replaced thereon at a constant level at the most convenient height for the operators.

To this end, the present invention contemplates, in its more comprehensive aspect, an improved work handling apparatus which includes with a novel rack having a plurality of movable work holders thereon and indexing means for causing the holders to be brought in succession into a convenient work handling position at any of a number of operating stations where work pieces on the holders are presented to a machine, power operated means at each station for operating the indexing means, and other power operated means for delivering the rack to each station with the above-mentioned indexing means on the rack and the operating means therefor in operative relation to each other.

The illustrated rack is provided, in accordance with a further feature of the invention, with a pair of endless conveyors for the work holders and indexing means for operating each conveyor intermittently in alternation with the other whereby a work holder first on one conveyor and then on the other is brought into work handling position. The above-mentioned power operated means for operating this indexing mechanism is actuated by the operator, while transferring work between the rack and the machine, in such a manner that, in the interval between the removal of a work piece from and its replacement upon the work holder on one conveyor in the work handling position, the other conveyor is operated to bring the work piece next to be operated upon into the work handling position.

In accordance with a further feature of the invention, the delivery of each rack to each station is effected by a driving member which propels the rack along a runway leading to and away from each operating station, each rack being automatically stopped at each station by an operator controlled stop which causes the disengagement of the drive between the driving member and the rack upon the arrival of the rack at the operating station. Other operator controlled means is also provided for retracting this stop out of the path of the rack whereby the drive between the driving member and the rack is re-established and the rack is advanced to or toward the succeeding station.

The above and other features of the invention and various combinations thereof in which invention is to be recognized will now be further disclosed in detail in the following specification with reference to the drawings, in which:

Fig. 1 is a plan view showing an illustrative apparatus embodying the invention;

Fig. 2 is a side elevation of a rack as viewed from the right;

Fig. 3 is a front elevation of a rack;

Fig. 4 is an enlarged plan view of a rack, portions of which have been broken away;

Fig. 7 is a plan view of power operated means, shown in small scale in Fig. 1, for operating the indexing mechanism;

Fig. 8 is a plan view of rack controlling structure at an operating station;

Fig. 9 is a side elevation of a portion of the structure shown in Fig. 8, as viewed from the right;

Fig. 10 is a plan view of the rack propelling means shown in small scale in Fig. 1;

Fig. 11 is an elevation of the structure shown in Fig. 10;

Fig. 12 is a sectional view of a part of the structure of Fig. 10, the section being taken along the line XII—XII;

Fig. 13 is a front elevation at an enlarged scale of driving structure shown at the bottom of the rack in Fig. 3; and Figs. 14 and 15 are side and front elevations, respectively, of mechanism, shown in small scale in Fig. 1, for actuating the power means of Fig. 7 for driving the rack indexing mechanism.

Figure 5:
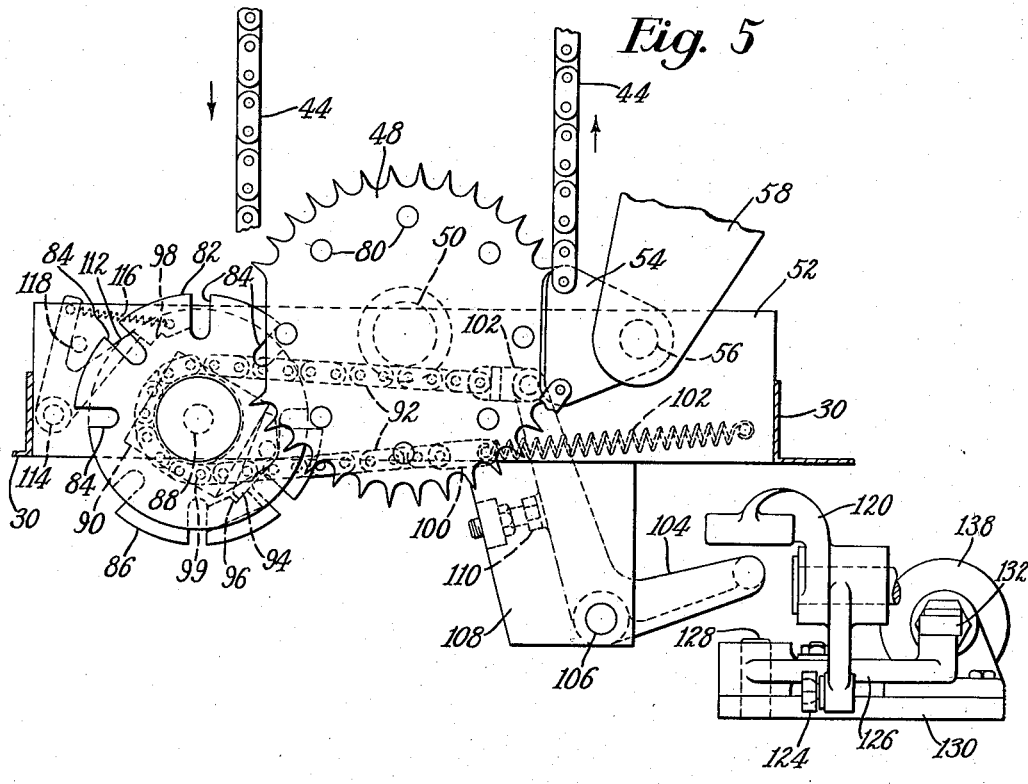
Fig. 5 is a side elevation of indexing mechanism on a rack, as shown at the bottom of Fig. 2, but at an enlarged scale.

The illustrative apparatus comprises a series of shoe supporting racks R (Figs. 1 to 4) which are mounted on casters 10 and are moved to a series of machines, such as M, M, in succession along a runway comprising rails 12 fixed to the factory floor. At operating stations S, S, adjacent to the machines, the rails are joined to platforms 14 having shallow grooves 16 therein which form continuations of the rails 12, the portions of the platforms outside of the rails being arranged to slope to the level of the floor to provide ramps over which a rack may be removed from or placed upon the platform.

The racks are power driven automatically from one to another of the stations S by a reciprocating traction bar 18 and provision is made, as will be described later, for automatically stopping each rack at each station S, for interrupting the drive between the bar and the rack and for re-establishing, under the control of the operator, the drive between the bar and the rack whereby the rack is advanced to or toward the next station S.

Each rack R comprises an endless conveyor for a series of twelve work holders or trays TL at the left-hand side of the rack and a second endless conveyor for a series of twelve trays TR at the right-hand side of the rack. Each series of trays has an ascending run, including six of the trays, at the front of the rack and a descending run, including the remaining trays, at the rear of the rack, and provision is made, as will be described in detail later, for alternately indexing the conveyors to elevate the trays on the ascending runs by the distance separating successive trays, one step at a time. Thus, the shoes to be operated upon are brought to a work handling position at a convenient height for the operator such, for example, as the height of the fourth tray from the bottom of the rack.

Each rack R has a rectangular base 20 upon which is mounted at each of its corners a caster 10. At each side of the rack and rising vertically from the base 20 is a post 22, the posts having secured thereto webs 24, 24 arranged in a common plane extending crosswise of the rack, and to the inner vertical edges of the webs there is fixed a pair of channels 26, 26. The webs and channels define forward and rear compartments for housing the ascending and descending runs, respectively, of each conveyor. Another pair of vertical posts 28 is fixed at their lower ends upon cross pieces 30 which are connected to the sides of the base 20. The posts 28 are connected near their upper ends by a bar 32 (Figs. 2 and 4) and at their upper ends by a plate 34. Upon a shaft 36 carried by the bar 32 there are rotatably mounted sprockets 38, 40 over which run chains 42, 44, respectively, one for each conveyor. Near the base of the rack the chains 42, 44 extend around and are driven by sprockets 46, 48, respectively, which are rotatably mounted upon a shaft 50. This shaft is carried by a strut 52 which is fixed to the cross pieces 30, 30. At equal intervals of about 9", each chain has a lug 54 upon each of which is pivotally mounted at 56 an arm 58 (Figs. 2 and 5), there being such an arm integral with each of the trays TL, TR. Each of the trays is fashioned from sheet metal and is provided with a pair of downwardly sloping wings 60 (Figs. 3 and 4) which are stamped out of the body of the tray and provide a recess or trough for receiving a shoe on a last.

Upon each of the arms 58 there is rotatably mounted a roll 62 (Figs. 2 and 3) which is adapted to engage the forward post 28 when the trays are in an ascending run of the rack and to engage the readward post 28 when the trays are in a descending run. The trays are thus supported so that their upper surfaces are inclined at an angle of about 20° from the horizontal, in order to facilitate the handling of the shoes.

As the trays pass from an ascending run to a descending run, their rolls 62 engage arcuate cams 64 (Fig. 2), which extend between the posts 28, causing the trays to be tilted rearwardly of the rack. In order further to control the tilting of the trays between their ascending attitude and their descending attitude, a pin 65 (Figs. 2 and 4) mounted upon each post 22, by engagement with a contoured edge 66 of the tray, prevents premature tilting of the tray into its descending attitude.

Similar control of the trays is afforded when they pass from a descending run to an ascending run. For this purpose, the trays are provided with pins 68, 70 which are fixed to the ends of the outer sides of the trays, these pins being arranged to cooperate with cam plates 72, 74 a pair of which are fixed to each side of the base 20. When each tray nears the bottom of a descending run, its pin 70 enters a cam track 76 in the plate 74 and causes the tray to be tilted forwardly of the rack toward its ascending attitude, whereupon the pin 68 enters a cam track 78 in the plate 72 for controlling the position of the tray until its roll 62 re-engages the forward post 28.

Figure 6:
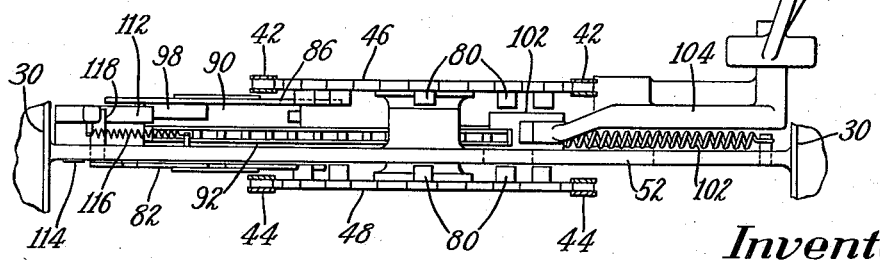
Fig. 6 is a plan view of the structure shown in Fig. 5.

For bringing trays TL, TR alternately to the work handling position, there is provided the following indexing mechanism for each rack which is situated at the base of the rack. Each of the sprockets 46, 48 (Figs. 5 and 6) is provided with eight pins 80 which project toward the other sprocket, the pins on each sprocket being equally spaced and each pin on one sprocket being opposite to a corresponding pin on the other sprocket. Adjacent to the inner side of the sprocket 48 is a disk 82 having formed therein four radial slots 84 adapted to receive the pins 80 and occupying a segment of 120°. The radius of this segment of the disk, the driving segment, is larger than the radius of the remaining idling segment for a purpose which will presently appear. Closely adjacent to the inner side of the sprocket 46 is a second disk 86 exactly like the disk 84; and the disks are fixed upon a shaft 88 with their driving segments diametrically opposite to each other. The shaft 88 is rotatably mounted upon the strut 52 so that as the disks 82, 86 are rotated their slots are brought into meshing relation with the pins 80 on the sprockets 46, 48, but the idling segments of the discs pass freely by the pins without engaging them. When the driving segment of a disc is presented to a sprocket, it is rotated to cause the associated series of trays to be moved through the distance between successive trays. It will now be apparent that in the first half-revolution (clockwise) of the discs 82, 86, from their positions illustrated in Fig. 5, the sprocket 48 will be rotated by the disc 82, the sprocket 46 remaining stationary; and in the next half-revolution of the discs, the disc 86 rotates the sprocket 46, the sprocket 48 now being stationary because the idling segment of the disc 82 is presented to the sprocket 48.

The discs 82, 86 are thus rotated, a half-revolution at a time, by the following mechanism. A block 90, about which a chain 92 is wrapped, is mounted to rotate freely upon the shaft 88 between the discs 82, 86. A pawl 94 pivoted upon the block 90 is adapted to engage one or the other of two abutments 96, 98 which are fixed diametrically opposite to each other upon the inner side of the disc 86. The chain 92 is permanently pinned to the block 90 at 99 and, at its lower end, is connected by a link 100 to a spring 102, the latter being connected to the strut 52. The upper end of the chain 92 is connected by a link 102 to the upper end of a lever 104 which is pivoted at 106 upon a bracket 108 extending downwardly from the strut 52. The lever 104 is biased counterclockwise (Fig. 5) by the spring 102 into its normal position of rest, in engagement with an adjustable abutment 110 which is threaded upon the bracket 108.

With each clockwise actuation of the lever 104, the pawl 94, acting upon one of the abutments 96, 98, drives the discs 82, 86 through one-half a revolution and, upon the release of the lever, it is returned to its original position by the spring 102, bringing the pawl 94 into operative relation to the other abutment. Retrograde movement of the discs is prevented by a pawl 112 which is pivoted at 114 upon the strut 52 and is biased by a spring 116 into engagement with a stop 118 fixed upon the strut 52 in such a position as to permit the pawl to engage an end of the adjacent abutment.

The racks R are automatically stopped, as will be described later, in a predetermined position at each station S which is convenient for the operator to remove shoes from the trays, perform the desired operation upon the shoes and replace them upon the trays, the above-described indexing mechanism being driven by power operated means next to be described. When a rack is brought to rest at a station S, the lower arm of the lever 104 of its indexing mechanism is disposed beneath the upper arm of a bell crank lever 120 (Figs. 5 and 6) which is pivotally mounted upon a bracket 122 secured to the platform 14. To the lower arm of the lever 120 there is connected one end of a rod 124 (Fig. 7) the other end of which is pivotally joined to a lever 126 which is mounted to swing horizontally about a stud 128 carried by a plate 130, the latter being fixed upon the floor. The right-hand end of the lever 126 is connected by a link 132 to a piston rod 134 carrying a piston 136 which slides within a cylinder 138 mounted upon the plate 130. Compressed air supplied to one end of the cylinder through a pipe 140 drives the piston through a working stroke in the direction of the arrow $p^1$, causing a clockwise actuation of the lever 104 (Fig. 5) and an indexing movement of one of the conveyors. At the end of the working stroke, a pin 142 on the piston rod 134 engages and swings in a counterclockwise direction a bell crank lever 144, which is pivoted at 146 upon the plate 130, whereupon compressed air is supplied through a pipe 148 to the other end of the cylinder and the piston is moved through a return stroke in the direction of the arrow $p^2$. Thus, the lever 120 is retracted from the lever 104 and the latter is permitted to return to its normal position against the stop 110 under the influence of the spring 102.

To initiate a cycle of operation of the piston 136 the operator, in transferring a shoe from the rack to the machine, strikes and swings to the right (Fig. 14) a bell crank lever 150 which is mounted to swing at 152 upon the upper end of a standard 154 which is fastened to the floor between the machine and the adjacent rail 12. The lever 150 is connected by a rod 156 to another bell crank lever 158 which is pivoted at 160 to the base of the standard 154. With counterclockwise movement of the lever 158, it engages and swings a latch 162 to the right, off the end of a bar 164 which is pivoted at 166 upon the standard 154. The above-mentioned latch is pivoted at 168 upon the standard and is biased toward the bar 164 by a spring 170 stretched between the latch and a pin fixed upon the standard. A screw 171 threaded into the bar 164 engages an upwardly biased control arm 172 of a valve 174, of conventional construction, to which compressed air is supplied through a pipe 176.

With the parts in their positions shown in Fig. 14, the valve 174 is set so as to cause compressed air to be delivered through the pipe 148 to the rear end of the cylinder 138, whereby the piston is held at the end of its return stroke. When the lever 150 is swung to initiate an indexing operation, the control arm 172 is liberated and, being biased upwardly about a pivot 178 on the body of the valve 174, causes compressed air to be delivered through the pipe 140 to the forward end of the cylinder whereby a working stroke is imparted to the piston 136. When, at the end of the working stroke, the bell crank 144 is engaged by the pin 142, a Bowden cable 180, which connects the bell crank with the bar 164, resets the latter under the latch 162, causing the return of the control arm 172 to its original horizontal position. Accordingly, the supply of compressed air to the cylinder 138 is now reversed automatically and the piston goes through its return stroke. Thus, for each actuation of the lever 150 by the operator of the lever 104 of the indexing mechanism on the rack receives first a clockwise actuation and then is released automatically for movement back to its normal position of rest. It will therefore be evident that, with successive actuations of the lever 150, first one and then the other of the conveyors will receive an indexing movement.

When air is admitted to the cylinder 138 through the pipe 140, air is exhausted from the cylinder through the pipe 148 back to the valve 174 and thence through a needle valve 182 into the atmosphere. Similarly, when air is supplied to the cylinder through the pipe 148, air is exhausted from the cylinder through the pipe 140 into the valve 174 and thence into the atmosphere through another needle valve 184. The needle valves are capable of being adjusted so as to control the rates of movement of the piston during both of its strokes.

The above-mentioned traction bar 18, for driving the racks R along the rails 12, is mounted to reciprocate lengthwise thereof close to the floor. For this purpose, the bar has attached thereto a series of spaced brackets 186 (Fig. 10) upon each of which a pair of flanged wheels 188 is mounted. A short rail 190 is fixed to the floor for each set of wheels 188 to run upon. The left-hand end of the traction bar (Fig. 1) is connected to power driven mechanism for causing the bar to be reciprocated continuously, with a stroke of about one inch, at a frequency of about 200 cycles per minute. Referring now to Figs. 10 and 11, there is pivotally attached to a lug 192, fixed upon the traction bar, one end of a link 194. The other end of this link is joined to one arm of a bell crank lever 196, the latter being pivotally mounted at 198 upon one of a pair of supports 200 which are fixed to the floor. The other arm of the lever 196 is connected by a link 202 to one arm of a bell crank lever 204, which is pivoted at 206 upon a frame member 208 carried by the supports 200. The lever 204 has a slotted arm 210 in the slot of which is received a crank pin 212 which is integral with a disc 214 fixed upon the lower end of a shaft 216. This shaft is rotatably mounted in the frame 208 and has fixed upon its upper end a gear 218. A pinion 220, meshing with the gear 218, is fixed to a shaft 222 which is rotatably mounted in the frame 208 and carries upon its upper end a pulley 224 over which there runs a belt 226 driven from any suitable source of power.

During one complete revolution of the gear 218, from its position illustrated in Fig. 10, the traction bar has imparted thereto an advancing stroke at the desired speed and a return stroke of a somewhat higher speed, the different speeds resulting from the relation between the path of the crank pin 212 and the slotted arm 210 of the bell crank 204.

Each rack R is provided with the following mechanism for providing a one-way driving connection between the rack and the above-mentioned traction bar 18. Projecting downwardly from the bottom of the base 20 at the left-hand side thereof is a bracket 228, Figs. 2, 3 and 13, carrying a pair of parallel links 230, 232 which are mounted to swing on the bracket and which are pivoted at their lower ends to a member 234 having a pad 236 of friction material which is adapted to engage the traction bar. The pad is biased into engagement with the bar by gravity and also by a spring 238 which is stretched between a hook on the link 230 and a pin fixed upon the bracket 228. Movement of the pad 236 in response to the spring 238 is limited, when the rack R is removed from the rails, by the engagement of an arm 240 which is integral with the link 230 with the bottom of the base 20. It will now be apparent that during each driving stroke of the traction bar 18 (to the left, Fig. 13) the pad 236 will grip the traction bar and cause the rack to be advanced. However, upon the return stroke of the traction bar the latter slides idly against the pad 236.

There rises from the left-hand end of the member 234 an arm 242 which projects from the left-hand side of the rack and carries a depending pin 244. Whenever one rack overtakes another the arm 242 or pin 244 of the overtaking rack, upon engaging the rack ahead, causes the pad 236 to be swung upwardly and held out of driving engagement with the traction bar. In the same way, the drive between the racks and the traction bar is disengaged automatically upon the approach of the rack to and its arrival at each operating station S.

Just in advance of the arrival of each rack at an operating station, its above-mentioned pin 244 strikes a stop 246 (Fig. 8) which is pivoted at 248 upon the platform 14 and the pad 236 of this rack is then disengaged from the traction bar causing the advance of the rack to be interrupted. The stop 246 is retracted, to permit the advance of the rack into the station S, by depressing a lever 250 (Figs. 8 and 9) which is pivoted upon a pin 252 mounted upon the upper end of a standard 254. The standard 254 is fixed to one of four base sections 256 which rise from the corners of the platform 14. The rear end of the lever 250 is connected by a Bowden cable 258 with an arm 260 which is integral with the stop 246, the lever normally being biased by a spring 262, stretched between the arm and the standard.

254, into a horizontal position determined by the engagement of the arm with a pin 264, projecting laterally from the standard 254. Soon after a rack has been released by the stop 246, a tail 266 on the stop is engaged by the arm 242 of this rack whereby the stop is returned to its operative position, in readiness to interrupt the forward movement of the next rack before it enters the operating station S.

A rack, after having been released by the retraction of the stop 246 for movement into the operating station, is stopped by the engagement of the pin 244 with a second stop 268 (Fig. 8), the latter being pivotally mounted at 270 upon the platform 14. At this time, the lever 104 of the rack indexing mechanism will have been brought directly underneath the lever 120 of the power driven means for operating the indexing mechanism, as referred to above. The stop 268 is biased toward its operative position by a spring 272, this position being determined by the engagement of an arm 274 on the stop with an abutment 276 on the platform 14. The stop 268 is swung forwardly, to release the rack for movement away from the operating station S, by depressing a lever 278 which is pivoted upon the above-mentioned pin 252 and is connected by a Bowden cable 280 with the stop. The lever 278 is biased, like the lever 250, by a spring 282 into a normal horizontal position determined by the engagement of the lever with the above-mentioned pin 264.

Withdrawal of a rack from the platform 14, either forwardly or rearwardly thereof, is normally prevented, but permitted at the will of the operator, by a set of retaining members 284, 286 (Fig. 8) at the front of the platform and a similar set of retaining members 288, 290 at the rear of the platform, all these members being disposed at the level of the base 20 of the rack on the platform. The member 286 is pivoted at 292 upon the left forward base section 256 and is connected by a link 294 with the retaining member 284, the latter being carried by a vertical shaft 296 which is rotatably mounted in a base section 256 at the right forward corner of the platform 14. Upon the upper end of the shaft 296 there is fixed a handle 298 which, upon being swung clockwise from its position illustrated in Fig. 8, causes the retaining members 284, 286 to be moved, equally and oppositely to each other, from their illustrated converging positions into substantially parallel relation so as to make a clear path for the removal of a rack from the platform forwardly thereof. The members 284, 286 are normally biased into their converging relation, in which they obstruct forward movement of the rack off the platform, by a spring 300 which is stretched between an arm 302 integral with the member 284 and a hook which is fastened to the associated base section 256.

Similarly, the retaining member 288 is pivoted at 304 upon the right rear base section 256 and is connected by a link 306 to the retaining member 290. The member 290 is fixed upon a shaft 308 which is rotatably mounted in the left rear base section 256 and carries upon its upper end a handle 310, similar to the above-mentioned handle 298. A spring 312 stretched between an arm 314 integral with the member 290 and a hook fastened to the associated base section 256 biases the members 288, 290 into their converging relation so as normally to obstruct movement of the rack off the platform rearwardly thereof. By swinging the handle 310 clockwise, the members 288, 290 are moved equally and oppositely to each other into their substantially parallel relation, permitting the rack to be freely moved off the platform rearwardly thereof.

Guidance of the rack during its lateral withdrawal from the platform is afforded by channels 316, 316 which are fixed upon the platform and receive a pin 318 (Fig. 9) which projects downwardly from the bottom of the base 20.

The use and operation of the apparatus described above will now be briefly summarized. It is to be assumed that the machines M, M of Fig. 1 represent two successive machines of a group of any desired number beside which there are the operating stations S, S connected by the rails 12. Further assuming that the apparatus will have been brought fully into use, there will be at least one rack R for each machine. When a rack is moved fully onto the rails 12 at their left-hand ends, the traction bar 18 having been put into operation, the rack is advanced toward the left-hand machine M (Fig. 1) by successive impulses imparted to the rack from the traction bar through the driving mechanism including the above-mentioned member 234. This member is, in effect, a pawl which frictionally grips the traction bar during its driving stroke, but freely slides upon the traction bar during its return stroke. When the rack closely approaches the station S, the pin 244, upon engaging the stop 246, is stopped, whereby the member 234 is swung upwardly out of driving engagement with the traction bar. If there is no rack at this operating station, the operator will depress the lever 250, causing the stop 246 to be retracted from the pin 244 and the advancing movement of the rack into the station to be resumed.

Upon the engagement of the pin 244 with the stop 268, the rack is disconnected from the traction bar in a position such as to bring the lever 104 of its indexing mechanism directly beneath the lever 120.

The operator will now present to the machine a shoe taken from the tray TL in the work handling position. In the case of most operators, the fourth tray from the bottom of the rack is at a convenient height and, for such operators, the position of this tray is the work handling position. In presenting this first left shoe to the machine, the operator avoids striking the lever 150; but in presenting each of the other left shoes to the machine, the operator brushes against the lever 150 thereby initiating a cycle of operation of the power means, including the piston 134 and cylinder 138, for driving the rack indexing mechanism. At such times, the driving segment of the disc 82 is presented to the sprocket 48, causing an indexing movement of the conveyor for the trays TR, which movement is completed by the time the operator is ready to remove a shoe from the tray TR in the work handling position.

The operator next removes the shoe from the tray TR in the work handling position, presents the shoe to the machine and, in so doing, brushes against the lever 150 whereby the power means for driving the indexing mechanism is actuated. Now, the driving segment of the disc 86 of the indexing mechanism is presented to the ratchet 46, whereby the conveyor for the trays TL is operated to bring the next left shoe to be operated upon into the work handling position.

This sequence of movements of the operator and operations of the apparatus is repeated until all the shoes on the rack will have been presented to the machine and returned to the rack. The operator now depresses the lever 278 which causes the stop 268 to be retracted from the rack and the drive between the rack and the traction bar 18 to be re-established. The rack is thus advanced along the rails up to the succeeding operating station S where the rack is again stopped by the engagement of its pin 244 with the stop 246 at this station. If there already is a rack awaiting entry into this station, it will be engaged by the pin 244 or arm 242 of an overtaking rack whereby the latter is disengaged from the traction bar 18 and comes to rest.

If it is desired to remove a rack from an operating station forwardly thereof, the operator swings the handle 298 clockwise causing the retaining members 284, 286 to be moved out of the path of the rack, which then can be rolled off the platform 14 under the guidance of the pin 318 and a channel 316 on the platform. Similarly, removal of a rack from the platform rearwardly thereof is permitted by swinging the handle 310 clockwise.

Having thus described our invention, what we claim as new and desire to secure by Letters Patent of the United States is:

1. Work handling apparatus for supplying work pieces to a work handling position at an operating station where the work pieces are to be presented to a machine adjacent to said station, said apparatus comprising a rack movable into and out of said station, said rack having a plurality of work holders and indexing means for moving said holders in succession into said work handling position, mechanism at said station for operating said indexing means, and means for delivering said rack into said station with said indexing means in operative relation to said mechanism.

2. Work handling apparatus for supplying work pieces to a work handling position at an operating station where the work pieces are to be presented to a machine adjacent to said station, said apparatus comprising a runway leading to and away from said station, a rack movable along said runway into and out of said station, said rack comprising a conveyor for a plurality of work holders and indexing means for operating said conveyor to bring said holders in succession into said work handling position, mechanism positioned at said station in operative relation to the indexing means of a rack at said station for operating said indexing means, means for propelling said rack into and out of said station, and means for stopping said rack in said station with said indexing means in operative relation to said mechanism.

3. Work handling apparatus comprising a runway arranged to extend beside a series of machines and having an operating station adjacent to each of said machines, a rack movable along said runway and comprising an endless conveyor for a plurality of work holders, said rack also having indexing means for operating said conveyor to cause said work holders in succession to be moved into and out of a work handling position, a driving member for propelling said racks along said runway, driving means mounted upon said rack for movement into and out of driving engagement with said driving member, mechanism at each of said stations for operating said indexing means, and means for disengaging said driving means from said driving member in response to movement of a rack into an operating station to bring the rack to rest with its indexing means in operative relation to said mechanism.

4. Work handling apparatus for use with a series of machines, said apparatus comprising a rack having an endless series of work holders and indexing means for advancing said work holders in succession into a work handling position, a runway having an operating station associated with each of the machines toward and away from which said rack is movable along said runway, a driving member extending continuously throughout the length of said runway, means for reciprocating said driving member lengthwise thereof, driving means mounted upon said rack for movement into frictional engagement with said driving member, power-operated means at each of said stations for operating said indexing means, a stop at each station for disengaging said driving means from said driving member in response to movement of the rack into the station whereby the rack is brought to rest with its indexing means in operative relation to said power-operated means, and operator controlled means at each station for actuating the power-operated means associated therewith.

5. Work handling apparatus comprising a runway arranged to extend beside a series of machines and having an operating station adjacent to each of said machines, a rack movable along said runway and comprising an endless series of work holders which are mounted for movement on said rack into and out of a work handling position, said rack also comprising indexing means for advancing said work holders in succession into the work handling position, a driving member extending lengthwise of said runway and mounted to reciprocate lengthwise thereof, driving means cooperating with said member to advance said rack in one direction along said runway step-by-step in response to movements of said driving member in the same direction, mechanism at each of said stations for operating said indexing means, a stop at each station normally within but movable out of the path of said driving means for disengaging the latter from said driving member in response to the movement of the rack into the operating station whereby said rack is stopped with its indexing means in operative relation to said mechanism, operator controlled means at each station for actuating said mechanism, and a second operator controlled means at each station for retracting said stop from said driving means whereby the latter is permitted to re-engage said driving member and the rack is propelled out of said station.

6. Work handling apparatus comprising a runway leading toward and away from an operating station associated with a machine, a driving member extending longitudinally of said runway coextensively therewith, means for reciprocating said driving member lengthwise thereof with alternate driving and return strokes, a rack mounted upon said runway for movement along it, driving means mounted upon said rack for yielding movement in the direction of the said driving stroke and toward said driving member into engagement therewith, a stop at said station disposed normally within the path of said driving means for disengaging said driving means from said driving member in response to movement of the rack into said station, and operator controlled means for withdrawing said stop from said driving means whereby said driving means is permitted to re-engage said driving member and the advance of the rack along said runway is resumed.

7. Work handling apparatus comprising a runway leading toward and away from an operating station associated with a machine, a driving member extending longitudinally of said runway coextensively therewith, means for reciprocating said driving member lengthwise thereof, a rack for holding a plurality of work pieces mounted for movement along said runway, driving means for operatively connecting said rack with said driving member comprising a member which is biased normally into frictional engagement with said driving member, a stop at said station disposed normally within the path of movement of said member for disengaging the latter from said driving member in response to movement of the rack into said station, and means for withdrawing said stop from said member whereby the latter is permitted to re-engage said driving member and the rack is moved out of said station.

8. Work handling apparatus for supplying work pieces to a work handling position at an operating station where the work pieces are to be presented to a machine adjacent to said station, said apparatus comprising a rack movable into and out of said station, said rack comprising an endless conveyor having a plurality of work holders thereon and movable to bring said work holders into said work handling position, indexing means for operating said conveyor intermittently to bring said holders in succession into said work handling position, and mechanism at said station disposed in operative relation to the indexing means of a rack in said station for operating said indexing means.

9. Work handling apparatus for supplying work pieces to a work handling position at an operating station where the work pieces are to be presented to a machine adjacent to said station, said apparatus comprising a rack movable into and out of said station, said rack having a pair of conveyors for a plurality of work holders, each conveyor being movable to bring its holders into a work handling position, indexing means for operating said conveyors alternately through the distance between successive work holders whereby a work holder first on one conveyor and then on the other is brought into work handling position in each cycle of operation of said indexing means, mechanism at said station cooperating with said indexing means to impart thereto a half-cycle of operation at a time, and operator controlled means for actuating said mechanism.

10. A rack for holding a plurality of work pieces comprising a pair of endless conveyors upon each of which are mounted a plurality of equally spaced work holders, each of said conveyors being movable to cause its holders to be brought in succession into a work handling position, and indexing means for intermittently operating each conveyor in alternation with the other through the distance separating successive holders whereby a work holder of each conveyor is moved into the work handling position associated therewith while the other conveyor is stationary.

11. A rack for holding a plurality of work pieces comprising a pair of endless conveyors each of which carries a plurality of work holders, each of said conveyors being movable to cause its holders to be brought successively into a work handling position, and indexing means for driving each conveyor intermittently in alternation with the other to advance a work holder on each conveyor into work handling position during each cycle of operation of said indexing means, said indexing means comprising a pawl and ratchet device for imparting a half cycle of operation to said indexing means for each actuation of said device whereby said conveyors are alternately operated to bring a work holder first on one conveyor and then on the other into a work handling position.

12. A rack for holding a plurality of work pieces comprising a pair of endless conveyors each of which runs about a driving sprocket and carries a plurality of equally spaced work holders, each of said conveyors being movable to cause its holders to be brought in succession into a work handling position, mechanism for selectively operating said conveyors step-by-step through the distance separating successive work holders, said mechanism comprising a rotatable driving member having diametrically opposed driving segments thereon, each of said segments being arranged to cooperate with one of said sprockets, and means for rotating said driving member a half-revolution at a time whereby said conveyors are operated in alternation to bring a work holder first on one conveyor and then on the other into the work handling position.

13. A rack for holding work pieces comprising a pair of endless conveyors each of which carries a plurality of equally spaced work holders and is arranged to run around a driving sprocket, means for selectively operating said conveyors to bring their holders in succession into a work handling position comprising a rotatable driving member for each of said sprockets, each driving member having a driving segment for operating the associated sprocket and an idling segment which moves past said sprocket without engaging it, and means for rotating said driving members so as to bring their driving segments alternately into operative relation with the associated sprockets whereby first one and then the other of said conveyors is operated to bring a work holder thereon into the work handling position.

References Cited in the file of this patent

UNITED STATES PATENTS

| | | |
|---|---|---|
| 2,014,458 | Winkley | Sept. 17, 1935 |
| 2,090,029 | Colburn | Aug. 17, 1937 |
| 2,387,315 | Cross | Oct. 23, 1945 |